May 26, 1936. H. F. SILVER Re. 19,986
DRY CLEANING APPARATUS
Original Filed Aug. 30, 1926
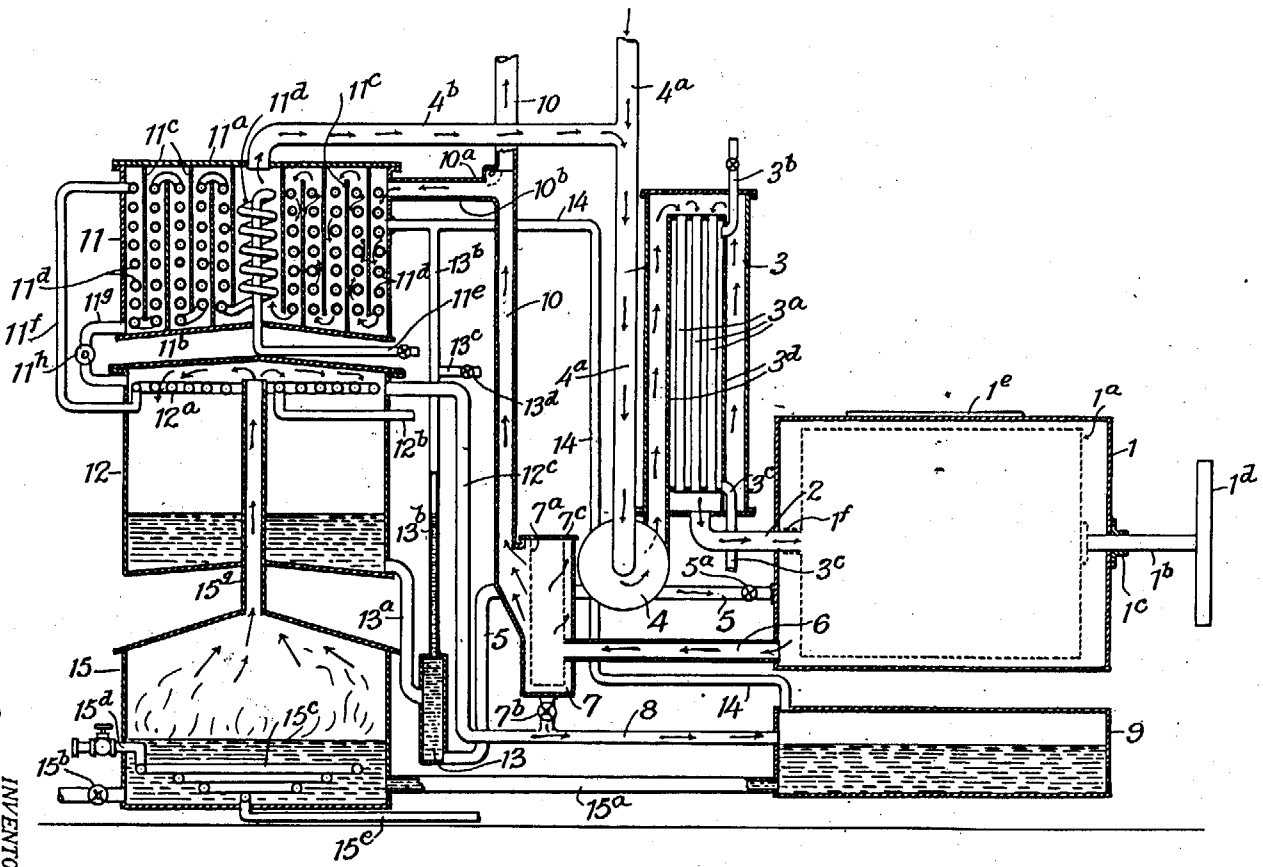
INVENTOR.
Harold F. Silver
BY
Alexander & Powell
ATTORNEYS Reissued May 26, 1936

Re. 19,986

UNITED STATES PATENT OFFICE 19,986

DRY CLEANING APPARATUS

Harold F. Silver, Salt Lake City, Utah, assignor to The American Laundry Machinery Company, Cincinnati, Ohio, a corporation of Ohio Original No. 1,775,699, dated September 16, 1930, Serial No. 132,513, August 30, 1926. Application for reissue October 28, 1931, Serial No. 571,663

24 Claims. (Cl. 68—38)

This invention is an improvement in dry cleaning apparatus, and the principal object of the invention is to provide a simple, novel and efficient apparatus for washing clothes or the like in a solvent, then drying the clothes, then defuming or removing gas fumes from the clothes, and finally distilling or reclaiming the solvent for reuse, the apparatus embodying certain novel arrangements and combinations of parts hereinafter set forth.

I will explain the invention with reference to the accompanying drawing which illustrates one practical embodiment thereof to enable others familiar with the art to adopt and use the same, and I will summarize in the claims the essentials of the invention, the novel features of construction, and novel combinations of parts, for which protection is desired.

The drawing shows a diagrammatic sectional view of my novel apparatus.

As shown in the drawing my novel apparatus preferably comprises a washer 1 supported above the floor level in any desired manner and having a revolvable drum 1[a] therein, mounted at one end on a horizontally disposed shaft 1[b] extending through a suitable stuffing box 1[c] in the side of the washer casing, said shaft having a gear wheel 1[d] thereon whereby the drum may be rotated within the washer casing.

Extending into the opposite end of casing 1, in alignment with shaft 1[b] is a pipe 2, the inner end of which forms a bearing for the adjacent end of drum 1[a], mounted thereon by means of a suitable oilless bearing 1[f], pipe 2 discharging into the interior of the drum. In the top of casing 1 is a charging door 1[e] through which the clothes or other articles may be introduced into the drum 1[a].

Pipe 2 is connected to the outlet of an air heater 3 preferably comprising a casing mounted in any suitable manner above the floor level, said casing having a plurality of vertically disposed pipes 3[a] mounted in a cylindrical casing 3[d], said pipes 3[a] extending from a point adjacent the top of the casing 3 to a point adjacent the bottom thereof, steam entering the casing 3[d] through a valved pipe 3[b] and draining from said casing through pipe 3[c]. The drying air for said heater is sucked in from the atmosphere through a pipe 4[a], by means of a suitable rotary blower 4 disposed adjacent a lower corner of heater 3, the air from blower 4 passing upwardly into the bottom of heater 3 adjacent one side thereof, and circulating upwardly along the inner side walls of heater 3 and down through the pipes 3[a] in the cylindrical casing 3[d], and out through pipe 2 into the drum 1[a].

The hot solvent is discharged into the washer 1 through a pipe 5 leading from a suitable supply tank and condenser, hereinafter described. The solvent and air are both discharged from washer 1 through a pipe 6 leading from the bottom of the washer 1 into the screen 7[a] of lint trap 7, from whence the liquid solvent passes down through a valve 7[b] in the bottom of the lint trap 7 through pipe 8 and into a closed solvent receiving tank 9. Lint trap 7 is provided with a removable cover 7[c] whereby the screen 7[a] may be removed for cleaning. The solvent laden air or vapors in lint trap 7 however pass upwardly through a pipe 10 to a Y-connection, one branch discharging into the atmosphere and the other into a cooler 11, hereinafter described, a fly-valve 10[a] being disposed in the Y-connection for closing one or the other branches thereof.

Cooler 11 preferably comprises a cylindrical casing having a closed top 11[a]; the bottom 11[b] thereof being slightly conical or concave. Within the casing 11 are a plurality of coaxial baffles 11[c], preferably cylindrical in shape and one within the other, the alternate baffles extending to the top 11[a] of the casing and the remaining baffles 11[c] extending to the bottom 11[b] of the casing, suitable holes being provided at the bottom of said baffles for permitting the condensate to drain to the outlet 11[g] at the bottom corners of the cooler. Within the baffles 11[c] are coils 11[d] through which cooling water circulates, the water entering through pipe 11[e] and leaving the coils through pipe 11[f]. An air pipe 4[b] connects the top of cooler 11 with the air pipe 4[a]. The air and vapors from lint trap 7 and pipe 10 pass through branch 10[b] into the side of cooler 11 adjacent the top thereof and pass over and under the baffles 11[c] to the center of the cooler, the air passing upwardly and out through pipe 4[b] and returning to blower 4, while the condensed vapors pass downwardly through outlet pipe 11[g], through sight-glass 11[h], and into the top of a solvent supply tank and condenser 12 disposed below cooler 11.

The apparatus is preferably provided with suitable means for removing any water which may chance to become mixed with the liquid detergent, either as the result of moisture in the air circulated through the apparatus or which is introduced into the apparatus with fabric, clothing or other material in a damp condition. Whatever be the nature of the dry cleaning apparatus as a whole, the water removing means includes a water trap introduced into the communication between two receptacles, each having appreciable volume or capacity, from one to the other of which the liquid detergent flows, the water trap being of such nature as to permit separation of the water from the detergent while it is flowing from receptacle to receptacle through said communication and its consequent collection in one place where it is readily removed at intervals during the normal operation of the apparatus. In the particular form shown the water trap is specially designed for use with a liquid detergent which is heavier than water, such as carbon tetrachloride, and the water trap is located in advance of the washer, which constitutes one of the said receptacles. Therefore, the water is separated by the water trap during the course of its flow from a receptacle of the apparatus to the washer.

In the form shown, condenser 12 is cylindrical and is closed at top and bottom. In its upper portion are cooling coils $12^a$ supplied with cooling water from a pipe $11^f$ coming from the coils $11^d$, the cooling water discharging through the pipe $12^b$. Cooled, condensed solvent or detergent collects in the bottom of the condenser 12, which serves as a receptacle in which to collect a relatively large volume of liquid detergent, and passes out from a low level in said condenser receptacle 12 by way of a pipe $13^a$ to the water trap 13 disposed below and at one side of condenser 12.

The lower portion of the water trap 13 is of appreciable size or capacity, although of course it need not have anywhere near the volume or capacity of either the receptacle 12 or washer 1. It is provided with an upwardly extending discharge portion $13^b$ provided with an outlet $13^c$ which may be controlled by a valve $13^d$, and which discharge portion further communicates with a vent pipe 14 connected to the receiving tank 9 and to the cooler 11.

The trap 13 communicates by way of pipe 5 and the valve $5^a$ with the chamber of the washer 1, said pipe having an upwardly extending portion rising vertically to a level above the bottom of discharge portion $13^b$, so that when the apparatus is in operation there will always be some liquid in said discharge portion.

One of the receptacles, such as either the receptacle 12 or the washer 1, or both of them, has a chamber portion which lies at approximately the level of the outlet $13^c$ or higher, and both receptacles communicate with the trap 13 below the upper discharge portion $13^b$ of reduced cross sectional area. Consequently, taking into consideration that water is the lighter of the two liquids, when the liquid level in either or both of said receptacles reaches or rises to approximately the level of the outlet $13^c$, the column of liquid in the trap will correspondingly rise to a level somewhat above said outlet and therefore drive out the supernatant water from the column within the trap, assuming that valve $13^d$ is either already open, or is opened by the operator for the purpose of discharge. Further, that receptacle which has a chamber portion lying approximately at the level of said outlet or higher, and which may be either or both of the two receptacles, also has its chamber including an appreciable volume lying below said outlet. Consequently, before liquid can be forced out from the outlet it is necessary to fill the appreciable volume of said chamber up to approximately the level of said outlet. As a result, when said chamber is alternately charged and emptied, as is the case with the chamber of a washer, or the chamber of condenser, or a receptacle supplied by a condenser or other part of the apparatus, discharge of water is not continuous but only intermittent, taking place for a brief period toward or at the end of the operation of charging such receptacle. In other words, intermittent discharge of water through the outlet is controlled or governed by rise and fall of liquid in a receptacle of appreciable volume whose chamber has a portion at approximately the level of said outlet. In the arrangement shown in the drawing, the discharge of water from the trap is produced intermittently by rise and fall of the liquid in the condenser 12, from which liquid is withdrawn to the washer for a cleaning operation, thereby lowering the level in the condenser 12 and carrying the water to the trap 13, and necessitating refilling the condenser to approximately the level of the outlet $13^c$ to discharge water from said outlet.

The upwardly extending discharge portion $13^b$ of the trap is of reduced cross sectional area as compared with the cross sectional area of the lower portion of the trap to which pipes $13^a$ and 5 are connected, the purpose of such construction being to reduce the area of the surface of contact between water and detergent when said surface of contact lies in the upper discharge portion of the trap, and thereby reduce and minimize, so far as possible, any possible reaction between detergent and water, such as might lead to the production of hydrochloric acid. To the same end the water trap is preferably trapped by the upwardly extending portion of pipe 5, so as to always maintain some liquid in the reduced upwardly extending discharge portion $13^b$ and thereby assist in maintaining the area of the surface of contact between water and detergent reduced to a minimum.

Mounted below the condenser 12 is a still 15 disposed at approximately the same level as tank 9, and connected therewith by a pipe $15^a$. A clean-out valve $15^b$ is provided at the bottom of still 15. Within the still is a coil $15^c$ of copper, through which steam enters and leaves by pipes $15^d$ and $15^e$, respectively. The top of still 15 is preferably conical to provide a vapor dome above the maximum level of solvent in the still and is connected by a pipe $15^g$ extending upwardly through condenser 12 to a point adjacent the top thereof, whereby the vapors from still 15 are discharged into the condenser 12. The vapor dome permits a substantial volume of vaporous solvent to remain in the still over a period of time before being discharged, whereby it becomes more completely vaporized so that larger volumes thereof will continuously pass to the condenser 12.

The still 15 and receiving tank 9 are disposed at substantially the same level, the receiving tank receiving the used solvent from the washer intermittently and supplying the still with used solvent through the pipe $15^a$. With such an arrangement, the level of liquid in the still will be governed by the level of liquid in the receiving tank and no flow control means between the receiving tank and the still is necessary. Also, with this arrangement, when solvent is dumped into the receiving tank, the temperature of the still is not affected as much as it would be if the solvent were dumped into the still direct. Thus, sudden temperature changes in the still due to incoming solvent are obviated.

In operation, the clothes to be cleaned are introduced into the drum $1^a$ of washer 1 through the air-tight charging door $1^e$, and the drum is then revolved by means of power applied to shaft $1^b$. Valve $5^a$ is then opened and hot solvent is allowed to fill the washer 1 to any desired level. During the washing operation valve $7^b$ however remains closed and the solvent passes through pipe 6 and fills the lint trap 7 to the same level as the liquid in washer 1. When the clothes have been sufficiently washed, valve $7^b$ is then opened and the dirty solvent is allowed to run through pipe 8 into the receiving tank 9. When the dirty solvent leaves the washer it flows through the screen $7^a$ and all lint and large particles of foreign matter are thus retained in the lint trap. If a second or rinsing operation is necessary, valve $7^b$ is again closed and the washing repeated.

When it is desired to dry the clothes, steam is allowed to enter the heating element $3^d$ of heater 3 through pipe $3^b$. Blower 4 is rotated and air is sucked from pipe $4^a$ and forced into heater 3 and then through pipe 2 into washer 1. The heated air evaporates any remaining portion of solvent in washer 1 and passes out of washer 1 through pipe 6, and through screen $7^a$ of lint trap 7, where all lint is retained, the air further passing upwardly through pipe 10, past fly-valve $10^a$, through pipe $10^b$ into cooler 11. In cooler 11 the air passes around the cooling coils $11^d$ which are cooled by a continuous stream of cold water passing through them. The resultant cooling of the air condenses the vaporized solvent, which flows from cooler 11 through pipe $11^g$ down into condenser 12. The air in cooler 11 however passes through pipe $4^b$ into pipe $4^a$ and hence again into blower 4. The drying operation is continued until all liquid solvent has been removed from the clothes in washer 1. Pipe $4^a$ is open to the atmosphere and the point at which it connects to the system is always at atmospheric pressure. There will be a slight flow of air inward from the atmosphere when the blower is started, and a slight flow outward when the blower is stopped, but the system soon reaches a state of equilibrium and there is no further flow.

A certain amount of vapor from the solvent remains in the washer after drying and for most satisfactory results should be removed from the clothes and the washer before the clothes are taken out. In order to accomplish such defuming, fly-valve $10^a$ is turned to divert the flow of air from pipe branch $10^b$, to the atmosphere. Circulation through cooler 11 is hence stopped and fresh air therefore commences to flow through pipes $4^a$, blower 4, heater 3, pipe 2, washer 1, pipe 6, lint trap 7, pipe 10, and into the atmosphere again. During the defuming operation valve $7^b$ must remain closed.

The dirty solvent collected in the receiving tank 9 passes through pipe $15^a$ into still 15. Steam is allowed to enter through pipe $15^d$ into the copper coils $15^c$ to heat the solvent. The vapors from still 15 pass upwardly through pipe $15^g$ into the supply tank and condenser 12 where the vapors are condensed around cooling coils $12^a$ which are cooled by a continuous stream of cold water flowing through them. As the water used in cooler 11 is raised only a few degrees in temperature, the same stream may be used in the coils $12^a$ of condenser 12. The course of the water is through pipe $11^e$, coils $11^d$, pipe $11^f$, coils $12^a$, and out through waste pipe $12^b$. The condensed solvent collects in the bottom of tank 12, flows through pipe $13^a$, water trap 13, and into pipe 5 for use again in washer 1. In the distilling operation all solids and greases remain in still 15, and after complete distillation of the solvent, may be removed through clean-out valve $15^b$. Tank 12 is preferably provided with an overflow pipe $12^c$ which returns any excess solvent to pipe 8 and receiving tank 9. The distilling operation is continuous and is not affected by the other operations of the machine.

In my novel apparatus, the introduction of the drying air directly into the inside of drum $1^a$ of washer 1, and the exit of the vapor laden air through pipe 6 at the bottom of the washer gives a more thorough drying effect than can be obtained by forcing the air in at the bottom of the washer and out through the top thereof because vapor from the solvent is heavier and colder than the entering air and consequently tends to settle in the bottom of the washer. Air forced in at the bottom would tend to flow in a channel toward the top without becoming saturated with the solvent vapor, whereas air forced in at the side or top tends to spread out in the washer and become saturated with vapor before being forced out at the bottom of the washer.

The use of one lint trap 7 for both washing and drying has a distinct advantage from an operating viewpoint. My arrangement of forcing the air out at the bottom of the washer makes this possible. The arrangement whereby still 15, condenser 12, and cooler 11 are made circular, and are placed one above the other on the same supporting member makes the construction very simple. The circular construction of the cooler with circular coils and circular baffles makes it possible to get the coldest part of the pipe coil where it will do the most good. The cooler is relatively small in size, convenient in shape, and has a great cooling capacity.

The flow of the cooling water first through the cooler 11 and then through the condenser 12 makes it possible to use the maximum cooling capacity of the water and at the same time secure the most efficient operation of the cooler and condenser. The efficiency of the cooler depends upon the coldness of the water, but the condenser will operate just as well with the water a few degrees warmer providing the coil is made sufficiently long.

The arrangement of piping whereby all tanks and chambers in the system always have access to the atmosphere without any intervening valves adds materially to the ease and safety of operation of the machine. It is very essential in maintaining the proper interchange of air and liquid when the machine is in operation. The fact that there is but one connection to the atmosphere for the whole system, except during the defuming operation when there are two, makes it possible for the air pressures within the system to balance themselves with a minimum loss of vapor into the atmosphere.

The arrangement of the various chambers and pipes whereby everything is kept above the floor line while the opening or charging door in the washer is still accessible to a man standing on the floor is of the greatest importance. This makes it possible to build a complete machine at the factory without any erection or fitting to be done by the customer, except the necessary water, air, and steam connections.

The placing of the fly-valve $10^a$ in the air line between line trap 7 and cooler 11 is important in minimizing the loss of vapor in the defuming operation.

I claim:—

1. In a dry cleaning apparatus, a washer; an air heater; a solvent supply tank; a lint trap, means for charging the washer with the solvent from the supply tank; means for returning the solvent from the washer through the lint trap to the supply tank; and means for passing heated air through the washer, the air discharging from the washer through the lint trap and passing again to the heater.

2. In a dry cleaning apparatus, a washer; a blower; an air heater; a solvent supply tank; a lint trap, means for charging the washer with the solvent from the supply tank; means for returning the solvent from the washer through the lint trap to the supply tank; said blower passing air from the atmosphere through the heater and washer, the air discharging from the washer through the lint trap and again to the atmosphere.

3. In a dry cleaning apparatus, a washer; an air heater; a solvent supply tank; a lint trap, a cooler; means for charging the washer with solvent from the supply tank; means for returning the solvent from the washer through the lint trap to the supply tank; means for passing heated air from the heater through the washer, said air and vapors discharging from the washer through the lint trap and passing to the cooler; means for passing the air in the cooler to the heater; means for passing the condensate in the cooler to the supply tank; and alternative means for diverting the air and vapors from the lint trap to the atmosphere before reaching the cooler.

4. In a dry cleaning apparatus, a washer, an air heater, a receiving tank, a still connected with the tank, a supply tank, a cooler, a lint trap, means for charging the washer with solvent from the supply tank, means for discharging the solvent from the washer through the lint trap to the receiving tank, means for passing heated air from the heater through the washer, said air and vapors discharging from the washer through the lint trap and passing to the cooler, means for passing the air in the cooler to the heater, means for passing the liquid condensed in the cooler to the supply tank, means for distilling the solvent from the still, means for condensing the distillate and collecting the condensate in said supply tank, and alternative means for diverting the air and vapors from the lint trap to the atmosphere before reaching the cooler.

5. In a dry cleaning apparatus, a washer, an air heater, a solvent receiving tank, a still connected with said tank, a supply tank, a cooler, a lint trap, means for charging the washer with solvent from the supply tank, means for discharging the solvent from the washer through the lint trap to the receiving tank, means for passing heated air from the heater through the washer, said air and vapors discharging from the washer through the lint trap and passing to the cooler, means for passing the air in the cooler to the heater, means for passing the liquid condensed in the cooler to the supply tank, means for distilling the solvent from the still, means for condensing the distillate and collecting the condensate in said supply tank, and an overflow pipe connecting the supply tank with the receiving tank.

6. A dry cleaning apparatus, comprising a washer having an air inlet, a solvent inlet, and a common outlet; an air heater; a connection between the heater and air inlet of the washer; a solvent supply tank; a connection between said tank and solvent inlet of the washer; a cooler; a lint trap connected with the outlet of the washer; and air connection between the lint trap and cooler; a solvent connection between the lint trap and supply tank; an air connection, open to the atmosphere, between the cooler and air heater; and a solvent connection between the cooler and supply tank.

7. In combination with apparatus as set forth in claim 7, a by-pass open to the atmosphere interposed in the connection between the lint trap and cooler; and a fly-valve controlling said by-pass.

8. A dry cleaning apparatus comprising a washer having an air inlet, a solvent inlet, and a common outlet, an air heater, a connection between the heater and air inlet of the washer; a solvent still, a solvent supply tank, a connection between said supply tank and solvent inlet of the washer, a cooler, a lint trap connected with the outlet of the washer, an air connection between the lint trap and cooler, a valved by-pass to the atmosphere interposed in said air connection, a solvent connection between the lint trap and still, an air connection open to the atmosphere between the cooler and air heater, a solvent connection between the cooler and supply tank, and means for condensing the distillate and collecting the condensate in said supply tank.

9. In combination with apparatus as set forth in claim 8, an overflow pipe from the top of the supply tank to the still.

10. A dry cleaning apparatus comprising a washer having an air inlet, a solvent inlet, and a common outlet, an air heater, a connection between the heater and air inlet of the washer, a solvent receiving tank, a supply tank, a still, a connection between said supply tank and solvent inlet of the washer, a cooler, a lint trap connected with the outlet of the washer, an air connection between the lint trap and cooler, a solvent connection between the lint trap and receiving tank, an air connection open to the atmosphere between the cooler and air heater, a solvent connection between the cooler and supply tank, means for supplying the still with solvent from the receiving tank, and means for condensing the distillate and collecting the condensate in said supply tank.

11. In combination with apparatus as set forth in claim 10, means interposed between the supply tank and washer for separating water from the solvent, and a vent pipe connecting said means with the cooler and receiving tank.

12. In combination with apparatus as set forth in claim 10, an overflow pipe connecting the top of the supply tank with the receiving tank.

13. Apparatus of the character described in claim 10, wherein the receiving tank and still are disposed at approximately the same level and the means for supplying the still with solvent from the receiving tank openly connects the lower ends of these vessels, whereby a minimum change in temperature in the still will be produced by intermittent discharge of used solvent from the lint trap into the receiving tank.

14. In a dry cleaning apparatus, a washer; a solvent receiving tank disposed below and connected with the washer; a still disposed at approximately the same level as the receiving tank; a pipe connection between the still and receiving tank maintaining the solvent in the still and receiving tank at the same level; said still having a vapor dome disposed above the maximum level of solvent in the receiving tank; whereby intermittent discharge of solvent from the washer to the receiving tank will have a minimum effect upon the temperature of the still.

15. A dry cleaning apparatus comprising a washer having a solvent inlet, and an outlet; a solvent receiving tank disposed below and connected with the outlet; a still disposed at approximately the same level as the receiving tank; a pipe connection between the still and receiving tank permitting the solvent to rise to the same level in both chambers; said still having a vapor dome disposed about the maximum level of solvent in the receiving tank; means for condensing the solvent vapors of the still; and means for directing the condensate to the solvent inlet; whereby intermittent discharge of solvent from the washer to the receiving tank will have a minimum effect upon the temperature of the still.

16. In a dry cleaning apparatus; a washer; a solvent supply tank; means for charging the washer with solvent from the supply tank; means for discharging the solvent from the washer; a lint trap in said discharging means for screening the used solvent; an air heater; and means for passing heated air through the washer, the heated air discharging from the washer through the lint trap to dry out the latter.

17. In a dry cleaning apparatus; a washer, means for charging the washer with a cleaning fluid; a lint trap through which the cleaning fluid is passed after use; and means for circulating air through the trap in alternation with the cleaning fluid to dry the same.

18. In a dry cleaning system for use with a volatile liquid detergent which is heavier than water, the combination of two chambered receptacles for the liquid, each having appreciable chamber volume, a chamber portion of the first thereof lying at a level above a chamber portion of the second thereof, a chambered water separator having an outlet from its upper portion, each of said receptacles communicating with the separator chamber below said outlet, the first receptacle from a low level of its chamber, so that liquid drains from the first receptacle to the second through the separator chamber, and one of said receptacles having a chamber portion lying at approximately the level of said outlet or higher and also having its chamber including an appreciable volume lying below said outlet, whereby rise of the level and consequent collection of an appreciable volume of liquid in said last named chamber causes discharge through said outlet of any water collected in the upper portion of said separator as the result of drainage from the first receptacle.

19. In a dry cleaning system, a combination of the form and arrangement specified in claim 18, in which the water separator is provided with an upwardly extending discharge portion leading to said outlet, the chambers of said receptacles communicating with the separator chamber below said discharge portion, and said discharge portion being of reduced and relatively small cross sectional area as compared with that of the separator chamber, whereby the area of surface of contact where reaction is possible between water and detergent is reduced to a minimum when said surface lies in said discharge portion.

20. In a dry cleaning system, a combination of the form and arrangement specified in claim 18, in which the water separator is provided with an upwardly extending discharge portion leading to said outlet, the chambers of said receptacles communicating with the separator chamber below said discharge portion, said discharge portion being of reduced and relatively small cross sectional area as compared with that of the separator chamber, whereby the area of surface of contact where reaction is possible between water and detergent is reduced to a minimum when said surface lies in said discharge portion, and the communication by which liquid flows away from the separator chamber includes a conduit provided with a portion extending upwardly beyond the lower end of said separator discharge portion, to thereby insure the presence at all times of some liquid in said discharge portion.

21. In a dry cleaning system for use with a volatile liquid detergent which is heavier than water, the combination of a washer, a receptacle having a chamber of appreciable volume, a portion of which lies at a level above a portion of the washer chamber, a chambered water separator having an outlet from its upper portion, said washer and receptacle each communicating with the separator chamber below its outlet, the receptacle from a low level of its chamber, so that liquid drains from receptacle to washer through the separator chamber, said receptacle having a chamber portion lying at approximately the level of said outlet or higher and also having its chamber including an appreciable volume lying below said outlet, whereby rise of the level and consequent collection of an appreciable volume of liquid in said receptacle causes discharge through said outlet of any water collected in the upper portion of said separator as the result of drainage from said receptacle.

22. In a dry cleaning system, a combination of the form and arrangement specified in claim 21, in which the water separator is provided with an upwardly extending discharge portion leading to said outlet, the chambers of said receptacle and washer communicating with the separator chamber below said discharge portion, and said discharge portion being of reduced and relatively small cross sectional area as compared with that of the separator chamber, whereby the area of surface of contact where reaction is possible between water and detergent is reduced to a minimum when said surface lies in said discharge portion.

23. In a dry cleaning system, a combination of the form and arrangement specified in claim 21, in which the water separator is provided with an upwardly extending discharge portion leading to said outlet, the chambers of said receptacle and washer communicating with the separator chamber below said discharge portion, said discharge portion being of reduced and relatively small cross sectional area as compared with that of the separator chamber, whereby the area of surface of contact where reaction is possible between water and detergent is reduced to a minimum when said surface lies in said discharge portion, and the communication by which liquid flows away from the separator chamber includes a conduit provided with a portion extending upwardly beyond the lower end of said separator discharge portion, to thereby insure the presence at all times of some liquid in said discharge portion.

24. In a dry cleaning system for use with a volatile liquid detergent which is heavier than water, the combination of two chambered receptacles for the liquid, each having appreciable chamber volume, a chamber portion of the first thereof lying at a level above a chamber portion of the second thereof, a chambered water separator having an upwardly extending discharge portion provided with an outlet, each of said receptacles communicating with the separator chamber below said discharge portion, the first thereof from a low level of its chamber, so that liquid flows from the first receptacle to the second through the separator chamber, and one of said receptacles having a chamber portion lying at approximately the level of said outlet or higher whereby rise of the liquid level therein causes discharge through said outlet of any water collected in the upper portion of said separator, and the discharge portion of said separator being of reduced and relatively small cross sectional area as compared with that of the separator chamber, whereby the area of surface of contact where reaction is possible between water and detergent is reduced to a minimum when said surface lies in said discharge portion.

HAROLD F. SILVER.